(12) United States Patent
Zhen et al.

(10) Patent No.: US 11,151,731 B2
(45) Date of Patent: Oct. 19, 2021

(54) APPARATUS AND METHOD FOR EFFICIENT REGULARIZED IMAGE ALIGNMENT FOR MULTI-FRAME FUSION

(71) Applicant: Samsung Electronics Co., Ltd., Suwon-si (KR)

(72) Inventors: Ruiwen Zhen, Allen, TX (US); John W. Glotzbach, Allen, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/727,751

(22) Filed: Dec. 26, 2019

(65) Prior Publication Data

US 2021/0042941 A1 Feb. 11, 2021

Related U.S. Application Data

(60) Provisional application No. 62/883,306, filed on Aug. 6, 2019.

(51) Int. Cl.
*G06T 7/33* (2017.01)
*H04N 5/235* (2006.01)
(Continued)

(52) U.S. Cl.
CPC .............. *G06T 7/337* (2017.01); *G06T 5/008* (2013.01); *G06T 5/009* (2013.01); *G06T 5/50* (2013.01); *G06T 7/207* (2017.01); *G06T 7/215* (2017.01); *G06T 7/238* (2017.01); *G06T 7/248* (2017.01); *H04N 5/2355* (2013.01);
(Continued)

(58) Field of Classification Search
CPC .......... G06T 7/337; G06T 5/50; G06T 5/008; G06T 5/009; G06T 7/248; G06T 7/238; G06T 7/215; G06T 7/207; G06T 2207/20221; G06T 2207/20021; G06T 2207/20208; H04N 5/2355
See application file for complete search history.

(56) References Cited

U.S. PATENT DOCUMENTS 6,173,087 B1 1/2001 Kumar et al.
6,809,758 B1 10/2004 Jones
(Continued)

FOREIGN PATENT DOCUMENTS

CN 1109243 A * 9/1995 ............. G06T 7/238
FR 2817697 A1 * 6/2002 ............. H04N 19/20
(Continued)

OTHER PUBLICATIONS

International Search Report and Written Opinion of the International Searching Authority dated Nov. 11, 2020 in connection with International Patent Application No. PCT/KR2020/010083, 11 pages.
(Continued)

*Primary Examiner* — Charles T Shedrick

(57) ABSTRACT

A method includes receiving a reference image and a non-reference image; dividing the reference image into a plurality of tiles; determining, using an electronic device, a motion vector map using coarse-to-fine based motion vector estimation; and generating an output frame using the motion vector map with the reference image and the non-reference image.

20 Claims, 8 Drawing Sheets

(51) Int. Cl.
  *G06T 5/50* (2006.01)
  *G06T 5/00* (2006.01)
  *G06T 7/246* (2017.01)
  *G06T 7/238* (2017.01)
  *G06T 7/215* (2017.01)
  *G06T 7/207* (2017.01)
(52) U.S. Cl.
  CPC .............. *G06T 2207/20021* (2013.01); *G06T 2207/20208* (2013.01); *G06T 2207/20221* (2013.01)

(56) References Cited

U.S. PATENT DOCUMENTS

| | | |
|---|---|---|
| 2007/0242900 A1 | 10/2007 | Chen et al. |
| 2009/0168887 A1* | 7/2009 | Lin .................... H04N 19/14 375/240.16 |
| 2010/0271498 A1 | 10/2010 | Hwang et al. |
| 2016/0035104 A1 | 2/2016 | Bigioi et al. |
| 2018/0189937 A1* | 7/2018 | Bala ........................ G06T 5/50 |
| 2019/0318455 A1* | 10/2019 | Gruen .................... G06T 15/06 |

FOREIGN PATENT DOCUMENTS

| | | | |
|---|---|---|---|
| WO | WO-0202173 A1 * | 1/2002 | ............. A61B 6/481 |
| WO | WO-02071333 A2 * | 9/2002 | ............. G06T 7/246 |

OTHER PUBLICATIONS

Zhang, Fan et al., "Parallax-tolerant Image Stitching", Department of Computer Science Portland State University, 2014 IEEE Conference on Computer Vision and Pattern Recognitionk pp. 3262-3269 (8 Pages).

* cited by examiner

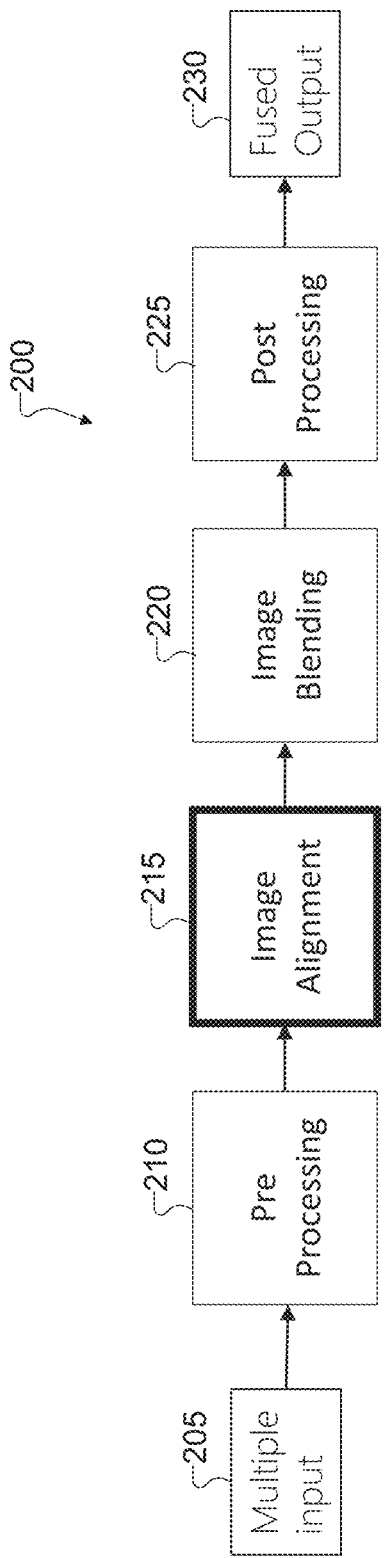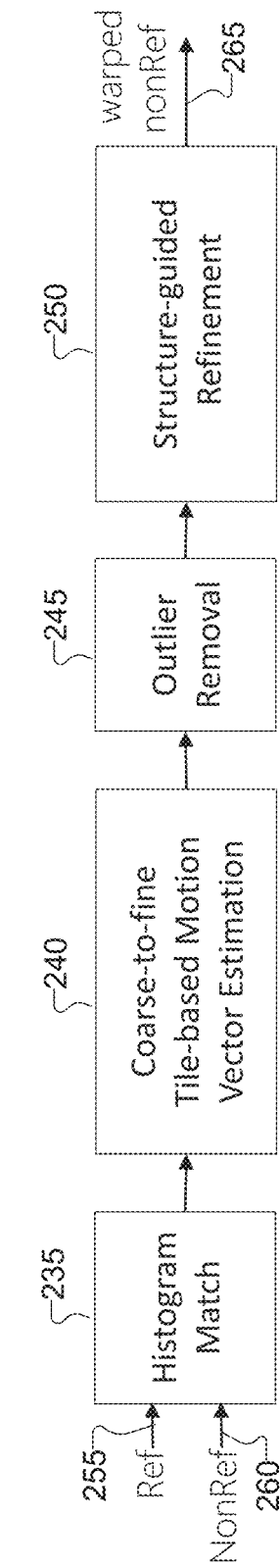

APPARATUS AND METHOD FOR EFFICIENT REGULARIZED IMAGE ALIGNMENT FOR MULTI-FRAME FUSION

CROSS-REFERENCE TO RELATED APPLICATION AND PRIORITY CLAIM

This application claims priority under 35 U.S.C. § 119(e) to U.S. Provisional Patent Application No. 62/883,306 filed on Aug. 6, 2019. This provisional application is hereby incorporated by reference in its entirety.

TECHNICAL FIELD

This disclosure relates generally to image capturing systems. More specifically, this disclosure relates to an apparatus and method for regularized image alignment for multi-frame fusion.

BACKGROUND

In the context of multi-frame fusion, aligning each non-reference frame with a selected reference frame is a crucial step. If this step has low quality, it directly affects the following image blending step and may lead to insufficient blending level or even ghost artifacts. Global image registration algorithms using a global transformation matrix is a common and efficient way to achieve alignment. But using a global transformation matrix only reduces misalignment due to camera motion and sometimes even fails to find a reliable solution in the absence of matched features. This situation frequently happens in high dynamic range (HDR) applications as input frames are under-exposed or over-exposed. An alternative is to use methods, such as optical flow, to find a dense correspondence between frames. Though these methods produce high-quality alignment, they require a significant computational cost posing a great challenge for mobile platforms.

SUMMARY

This disclosure provides an apparatus and method for efficient regularized image alignment for multi-frame fusion.

In a first embodiment, a method includes: receiving a reference image and a non-reference image; dividing the reference image into a plurality of tiles; determining, using an electronic device, a motion vector map using coarse-to-fine based motion vector estimation; and generating an output frame using the motion vector map with the reference image and the non-reference image.

In a second embodiment, an electronic device includes at least one sensor and at least one processing device. The at least one processing device is configured to receive a reference image and a non-reference image; divide the reference image into a plurality of tiles; determine a motion vector map using coarse-to-fine based motion vector estimation; and generate an output frame using the motion vector map with the reference image and the non-reference image.

In a third embodiment, a non-transitory machine-readable medium contains instructions that when executed cause at least one processor of an electronic device to: receive a reference image and a non-reference image; divide the reference image into a plurality of tiles; determine a motion vector map using coarse-to-fine based motion vector estimation; and generate an output frame using the motion vector map with the reference image and the non-reference image.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments thereof, but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 2A and 2B illustrate an example process for efficient regularized image alignment using a multi-frame fusion algorithm in accordance with this disclosure;

DETAILED DESCRIPTION

FIGS. 1 through 8, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

The requirements of speed and memory inspire construction of a simple algorithm to strike a balance between computational cost and correspondence quality. A coarse-to-fine alignment on four-level Gaussian pyramids of the input frames is first performed to find similarities between image tiles. Then an outlier rejection step followed by a quadratic structure-preserving constraint is adopted to reduce image content distortion from the previous step.

In the context of multi-frame fusion, aligning each non-reference frame with a selected reference frame is a crucial step. If this step has a low quality, it directly affects the following image blending step and may lead to insufficient blending level or even ghost artifacts. Global image registration algorithms that achieve alignment using a global transformation matrix are a common and efficient way, but these algorithms only reduce misalignment due to camera motion, and sometimes even fail to find a reliable solution in the absence of matched features (This situation frequently happens in HDR applications as input frames are under-exposed or over-exposed). An alternative is to find a dense correspondence between frames, such as optical flow. Though it produces high-quality alignment, its significant computational cost poses a great challenge for mobile platforms. One or more embodiments of the present disclosure, based on the requirement of speed/memory, provide a simple algorithm that strikes a balance between computational cost and correspondence quality. A coarse-to-fine alignment on four-level Gaussian pyramids of the input frames is first performed to find correspondences between image tiles. Then an outlier rejection step followed by a quadratic structure-preserving constraint is adopted to reduce image content distortion from the previous step. Its effectiveness and efficiency has been demonstrated via large number of input frames used for HDR and MBR applications. One or more embodiments of the present disclosure provide an algorithm capable of aligning multiple images/frames in the presence of camera motion or small object motion without introducing significant image distortion. It is a necessary component in the pipeline of any multi-frame blending algorithms, such as high dynamic range imaging and motion blur reduction technique, both of which fuse several images captured with different exposure/ISO settings.

Figure 1:
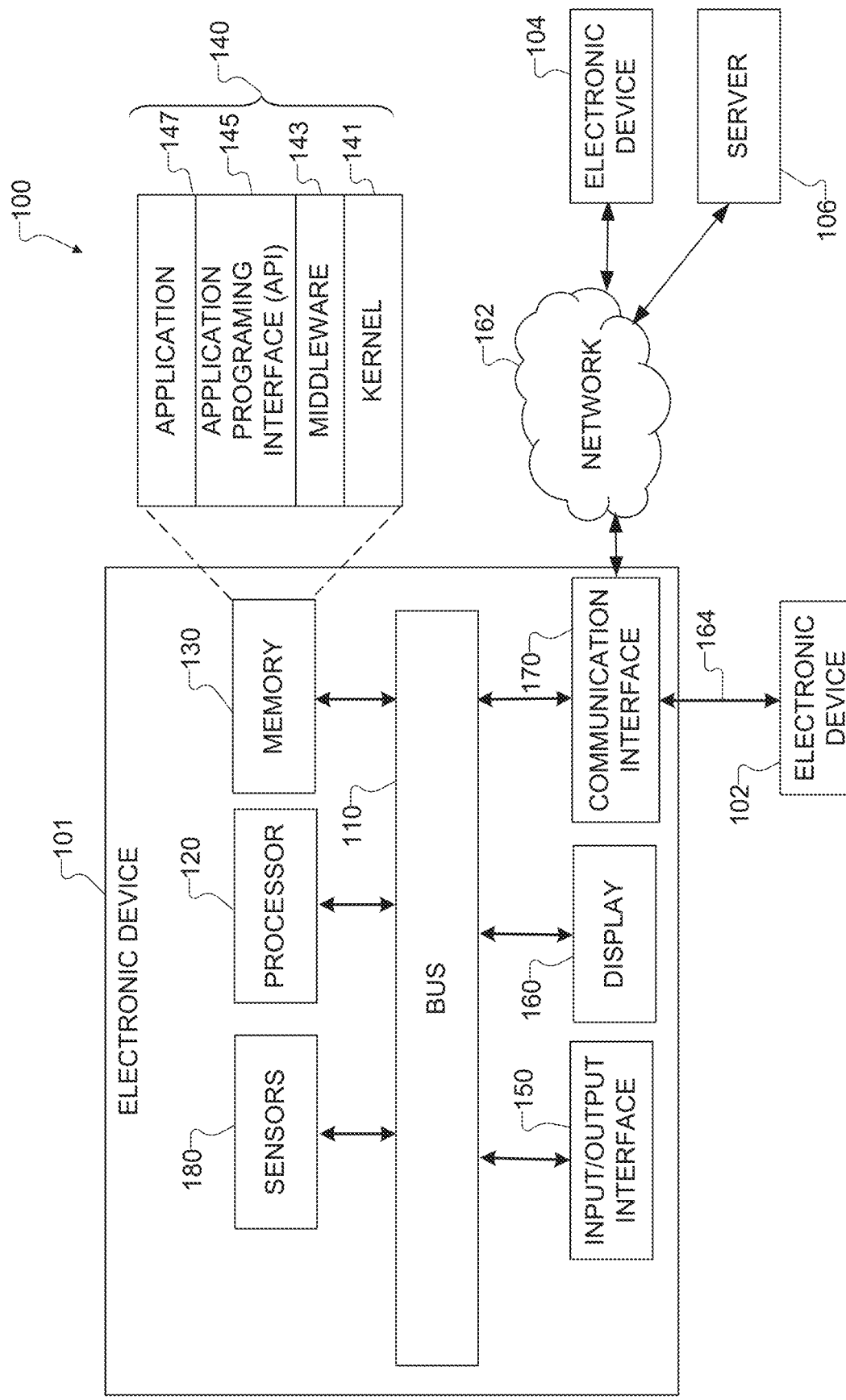
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to one or more embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to control on at least one of the other components of the electronic device 101 and/or perform an operation or data processing relating to communication. In some embodiments, the processor 120 is a graphics processor unit (GPU). For example, the processor 120 can receive image data captured by at least one camera during a capture event. Among other things, the processor 120 can process the image data (as discussed in more detail below) to generate HDR images of dynamic scenes using graph cut-based labeling.

The memory 130 can include a volatile and/or non-volatile memory. For example, the memory 130 can store commands or data related to at least one other component of the electronic device 101. According to one or more embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for image capture as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a biophysical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can also include an inertial measurement unit, which can include one or more accelerometers, gyroscopes, and other components. The sensor(s) 180 can further include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can optionally support the electronic device 101 by performing or supporting at least one of the operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

FIGS. 2A and 2B illustrate an example process for efficient regularized image alignment using a multi-frame fusion algorithm in accordance with this disclosure. For ease of explanation, the process 200 shown in FIG. 2A is described as being performed using the electronic device 101 shown in FIG. 1. However, the process 200 shown in FIG. 2A could be used with any other suitable electronic device and in any suitable system.

The process 200 includes steps to capture multiple image frames of a scene at different exposures and process the image frames to generate a fused output. The fused imaged is blended using an additional chroma processing to reduce ghosting and blurring in images.

The process 200 involves the capture of multiple image frames 205. In the example shown in FIG. 2A, two image frames are captured and processed, although more than two image frames may also be used. The image frames 205 are captured at different exposures, such as when one image frame 205 is captured using an automatic exposure ("auto-exposure") or other longer exposure and the image frame 205 is captured using a shorter exposure (compared to the automatic or a longer exposure). An auto-exposure generally refers to an exposure that is automatically, such as without intervening human action, determined by a camera or other device, typically with little or no user input. In some embodiments, a user is allowed to specify an exposure mode (such as portrait, landscape, sports, or other modes), and the automatic exposure can be generated based on the selected exposure mode without any other user input. Each exposure setting is typically associated with different settings for the camera, such as different apertures, shutter speeds, and camera sensor sensitivities. A shorter-exposure image frame is typically darker, lacks image details, and has more noise compared to an auto-exposure or other longer-exposure image frame. As a result, the shorter-exposure image frame may include one or more regions that are under-exposed, while the auto-exposure or other longer-exposure image frame may include one or more regions that are over-exposed. In some embodiments, the short-exposure frame may only have a shorter exposure time, but has a higher ISO to match the overall image brightness of the auto-exposure or long-exposure frame. Note that while often described below as involving the use of an auto-exposure image frame and at least one shorter-exposure image frame, embodiments of the present disclosure may be used with any suitable combination of image frames captured using different exposures.

In some instances, during a capture operation, the processor 120 can control the camera of the electronic device 101 so that the image frames 205 are captured rapidly, such as in a burst mode. A capture request that triggers the capture of the image frames 205 represents any suitable command or input indicating a need or desire to capture an image of a scene using the electronic device 101. For example, the capture request could be initiated in response to a user's pressing of a "soft" button presented on the display 160 or the user's pressing of a "hard" button. In the illustrated example, two image frames 205 are captured in response to the capture request, although more than two images could be captured. The image frames 205 may be produced in any suitable manner, such as where each image frame is simply captured by a camera or where a multiple-frame fusion technique is used to capture multiple initial image frames and combine them into one or more of the image frames 205.

During subsequent operations, one image frame 205 can be used as a reference image frame, and the other image frame 205 can be used as a non-reference image frame. Depending on the circumstances, the reference image frame may represent the auto-exposure or other longer-exposure image frame, or the reference image frame may represent the shorter-exposure image frame. In some embodiments, the auto-exposure or other longer-exposure image frame may be used as the reference image frame by default, since this typically allows the image frame with greater image details to be used more when generating a composite or final image of a scene. However, as described below, there may be some instances in which this is not desirable (such as due to the creation of image artifacts), in which case the shorter-exposure image frame may be selected as the reference image frame.

In the pre-processing operation 210, the raw image frames are pre-processed in some manner to provide part of the image processing. For instance, the pre-processing operation 210 can perform a white balancing function to change or correct the color balance in the raw image frames. For example, the pre-processing operation 210 also can perform a function to reconstruct full color image frames from incomplete color samples contained in the raw image frames using a mask (such as a CFA mask).

As shown in FIG. 2A, the image frames 205 are provided to an image alignment operation 215. The image alignment operation aligns the image frames 205 and produce aligned image frames. For example, the image alignment operation 215 can modify the non-reference image frame so that particular features in the non-reference image frame align with corresponding features in the reference image frame. In this example, the aligned image frame represents an aligned version of the reference image frame, and the aligned image frame represents an aligned version of the non-reference image frame. Alignment may be needed to compensate for misalignment caused by the electronic device 101 moving or rotating between image capture events, which causes objects in the image frames 205 to move or rotate slightly (as is common with handheld devices). The image frames 205 can be aligned both geometrically and photometrically. In some embodiments, the image alignment operation 215 can use global Oriented FAST and Rotated BRIEF (ORB) features and local features from a block search to align the image frames, although other implementations of the image registration operation could also be used. Note that the reference image frame here may or may not be modified during the alignment, and the non-reference image frame could represent the only image frame that is modified during the alignment.

The aligned image frame (the non-reference image frame) can be histogram matched as part of the pre-processing operation 210. Histogram matches a histogram of the non-reference image frame to a histogram of the reference image frame, such as by applying a suitable transfer function to the aligned image frame. For example, histogram matching can operate to make the brightness level generally equal for both aligned image frames. Histogram matching may involve increasing the brightness of the shorter-exposure image frame to substantially match the brightness of the auto-exposure or other longer-exposure image frame, although the converse may occur. This also results in the generation of a pre-processed aligned image frame associated with the aligned image frame. More details regarding the image alignment operation 215 are described in relation to FIG. 2B.

The aligned image frame is then blended in a blending operation 220. The blending operation 220 blends or otherwise combines the pixels from the image frames based on the label map(s) in order to produce at least one final image of a scene. The final image generally represents a blend of the image frames, where each pixel in the final image is extracted from either the reference image frame or the non-reference image frame (depending on the corresponding value in the label map). Additional image processing operations can occur once the proper pixels are extracted from the image frames and used to form an image. Ideally, the final image has little or no artifacts and improved image details, even in areas where at least one of the image frames 205 were over-exposed or under-exposed.

The blended frames then are put through a post-processing operation 225. The post-processing operation 225 can perform any processing to the blended image to complete the fused output image 230.

FIG. 2B illustrate an example local image alignment operation 215 in accordance with this disclosure. If multiple frames are being captured, the cameras move when the lens is not kept perfectly still. Between different images captured, slight movement in the camera causes the images to be misaligned. The images need to be aligned.

Global alignment is the determination of how much the camera moves between each of the frames. A model would be assigned for the movement of the image based on the movement of the camera. The images are corrected based on the model assigned based on the determined movement of the camera from the reference frame. This method would only capture the camera motion and the models are imperfect. Even though only the camera is determined to move in a single frame, this is not always true for a real camera as there are always objects moving in the scene, or other secondary effects may be present such as depth-related distortion from motion. This leads to approximating camera motion. If it appears that two images are aligned, global alignment would still have features in the images that are not correctly aligned.

Certain alignments start with a simple global alignment and then allow the alignment to adapt to local content. One method to accomplish this is through optical flow methods. An optical flow method tries to confirm or find that every location in a non-reference image is also found in the reference image. If this is performed for every pixel, a full map of how everything has moved can be generated. This method is costly for processing time and expensive, which is not practical for mobile electronics. The flow techniques also have complications for images if there is no real image content (such as a wall or sky) where the output would be completely noisy or just wrong.

Certain alignments provide for gaining the benefits of optical flow quality in the alignment without the costs and adding in more regularization to ensure that the objects align appropriately in the final image. Small motions are also a consideration that can be corrected or situations where the camera moves; but the objects in the images move independently. Small motions tend to go with the camera and appear as camera motion. Large motion will look like real scene motion and is outside the determination of alignment.

The image alignment operation can include a histogram matching operation 235, a coarse-to-fine tile-based motion vector estimation operation 240, an outlier removal operation 245, and a structure-guided refinement operation 250. The image alignment operation 215 receives input reference frame 255 and non-reference frame 260 that have been processed in the pre-processed operation 210. During subsequent operations, one image frame can be used as a reference image frame 255, and the other image frame can be used as a non-reference image frame 260. Depending on the circumstances, the reference image frame 255 may represent the auto-exposure or other longer-exposure image frame, or the reference image frame 255 may represent the shorter-exposure image frame. In some embodiments, the auto-exposure or other longer-exposure image frame may be used as the reference image frame 255 by default, since this typically allows the image frame with greater image details to be used more when generating a composite or final image of a scene. As described below, there may be some instances in which this is not desirable (such as due to the creation of image artifacts), in which case the shorter-exposure image frame may be selected as the reference image frame 255.

The image alignment operation 215 includes a histogram matching operation 235. The histogram match occurs first to bring multiple images or frames with different capture configurations to a same brightness levels. Histogram matching is necessary for the following search of motion vectors. The purpose of a histogram match is to take two images that may not be exposed the same way and adjust accordingly. An image that is under exposed is compared to an image that is correctly exposed, which would cause one image to be darker than the other. The darker image would need to be adjusted to the correctly exposed image to properly compare the two images. A short exposure time with high gain to achieve a same effect as a longer exposure with low gain would also need histogram matching. These pictures should look the same, but will have slightly different images, which can use the histogram matching for normalize differences between images to make the images look as similar as possible.

The histogram match also occurs first to bring multiple image/frames with different capture configuration to the same brightness level. This histogram matching can be used for searching of motion vectors, which is unnecessary for sparse features such as oriented FAST and rotated BRIEF (ORB). A histogram of the non-reference frame 260 is compared to a histogram of the reference frame 255. The histogram of the non-reference frame 260 is transformed to match the histogram of the reference frame 255. The transformed histogram of the non-reference frame can be used later in the image alignment operation 215, as well as in the image blending operation 220 or the post processing operation 225.

A tile-based motion vector image breaks up the image into multiple tiles and tries to find motion map like a flow. The goal would be to find for each tile the motion vector to find the content of tile in another frame. The result is a two-dimensional (2D) map of motion vectors of the reference frame. The tile-based motion vectors can generate evenly distributed features. For example, sparse features such as ORB are sparse and sometimes biased towards local areas. The distribution property reduces the probability of registration failure.

The coarse-to-fine tile-based motion vector estimation (MV estimation) 240 can determine motion vectors for a patch between the reference frame 255 and the non-reference frame 260. The tile-based search of motion vectors can generate evenly distributed features. Sparse features such as ORB are sparse and sometimes biased towards local areas. The distribution property reduces the probability of registration failure. The search of motion vectors (features) can be performed in a coarse-to-fine scheme to reduce a search radius, which in turn decreases processing time. The selection of tile size and search radius guarantees that most common cases could be covered. Sub-pixel search improves alignment accuracy. Normalized cross correlation is adopted to be robust against poor histogram matching or different noise levels. The output of the MV estimation 240 is a motion vector for each of the patches into which the reference frame 255 is divided. The set of motion vectors for the reference frame 255 and non-reference frame 260 are output for use later in the image alignment operation 215, image blending operation 220, or the post processing operation 225. The MV estimation 240 can use a hierarchy implementation to reduce a search radius for faster results. The MV estimation 240 can search the motion vector on a sub-pixel lever for greater accuracy. The MV estimation 240 can search for a motion vector for each tile providing sufficient matched features for a more robust motion vector estimation. The MV estimation 240 can search using an L2 distance for images with the same exposure. For images with different exposures, the L2 distance can be replaced by normalized cross-correlation. More details regarding the MV estimation 240 are described with respect to FIG. 3.

The outlier removal operation 245 can receive the locally aligned non-reference frame 260 and can determine if any outliers were produced during the motion vector estimation 240. The outlier removal is the concept of removing items that do not match to the global motion. For example, a person moving across the frame might show a motion vector in a substantially different direction. This motion would be labeled as an outlier.

Outlier rejection can reject undesirable motion vectors (motion vectors on flat areas and large motion areas) in some multi-frame fusion modes. In multi-frame higher dynamic range (HDR) applications, motion vectors are not reliable on flat areas due to an absence of features. In other multi-frame applications (such as multi-frame noise reduction), motion vectors on large moving objects are not constrained during the search. Both situations could lead to non-reference image distortion, which is generally not a problem as the blending operation 220 can reject inconsistent pixels between the reference image 255 and the warped non-reference image 265. In some fusion modes, such as HDR, the image contents in the non-reference images 260 are unique and can appear in the final composite image. The outlier removal 245 can reject erroneous motion vector outliers to avoid potential image distortion for a more robust image. More details regarding the outlier removal operation 245 are described with respect to FIG. 4.

The structure-guided refinement operation 250 can preserve an image structure from issues such as warping. A quadratic optimization problem is set up to try to maintain structure in the image. For example, if a building with edge is in the image, the edges of the building should not to be distorted. The refinement operation 250 can preserve the objects, like the edges in the building, in the scene.

The structure-guided mesh warping can be used in multi-frame fusion modes. The refinement operation 250 can impose constraints on flat areas and motion areas with a global transform, while deforming the remaining image area with searched features. Compared to common optical flow, the quadratic optimization equation can be solved in a closed-form and the processing time is feasible on mobile platforms. The refinement operation 250 can pose a constraint as a quadratic optimization problem and solve the problem using linear equations for faster results. The refinement operation 250 can add similarity constraints and global constraints to reduce image contents distortion for enhanced structure preservation. The refinement operation can output a warped non-reference frame 265 to the image blending operation 220 or the post processing operation 225. More details regarding the structure-guided refinement operation 250 are described with respect to FIG. 5.

Although FIGS. 2A and 2B illustrate examples of a process for efficient regularized image alignment using a multi-frame fusion algorithm, various changes may be made to FIGS. 2A and 2B. For example, while shown as a specific sequence of operations, various operations shown in FIGS. 2A and 2B could overlap, occur in parallel, occur in a different order, or occur any number of times. Also, the specific operations shown in FIGS. 2A and 2B are examples only, and other techniques could be used to perform each of the operations shown in FIGS. 2A and 2B.

Figure 3:
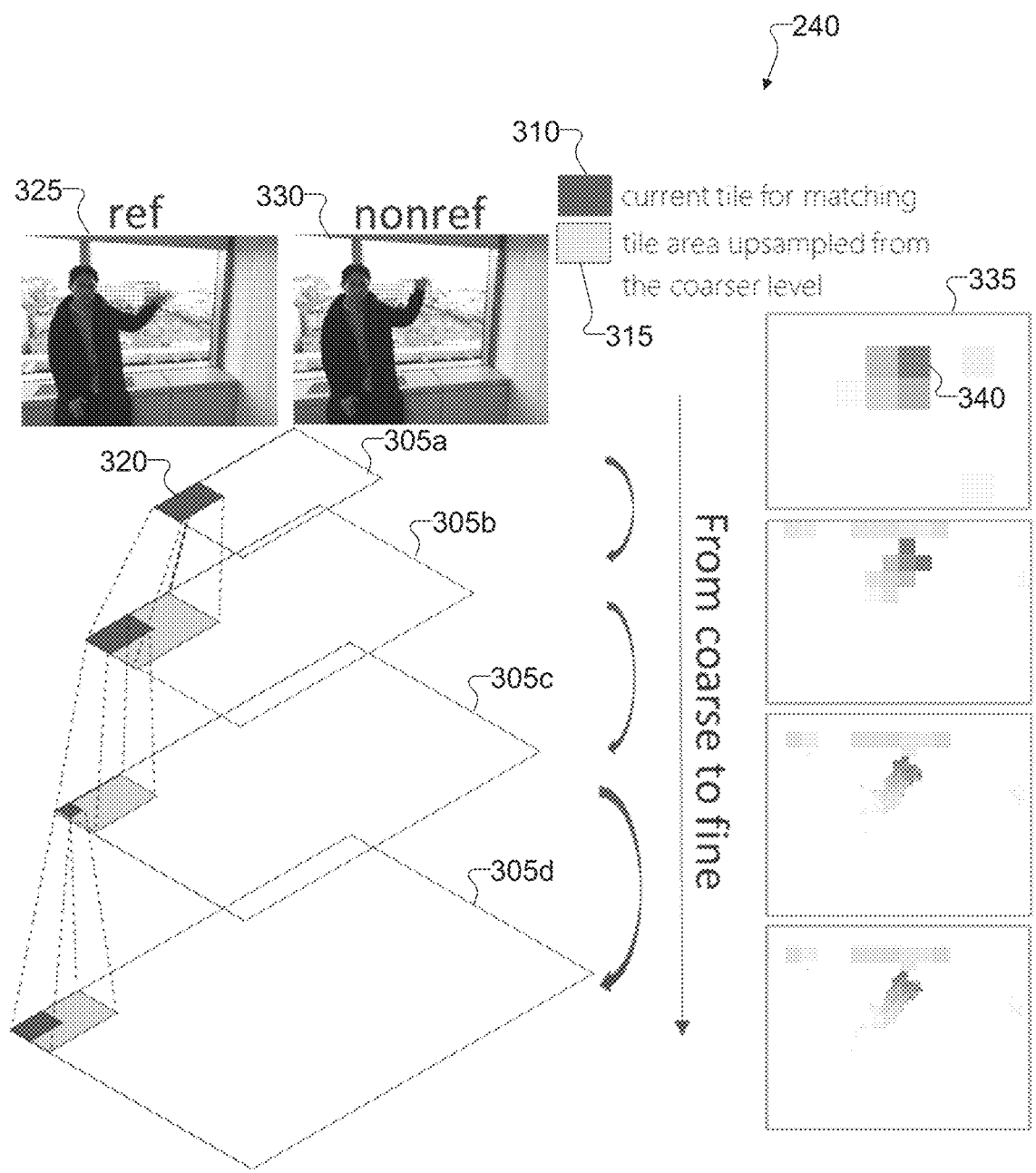
FIG. 3 illustrates an example coarse-to-fine tile-based motion vector estimation in accordance with this disclosure.
Figure 4A:
FIGS. 4A, 4B, 4C, and 4D illustrate an example outlier removal in accordance with this disclosure.
Figure 4B:
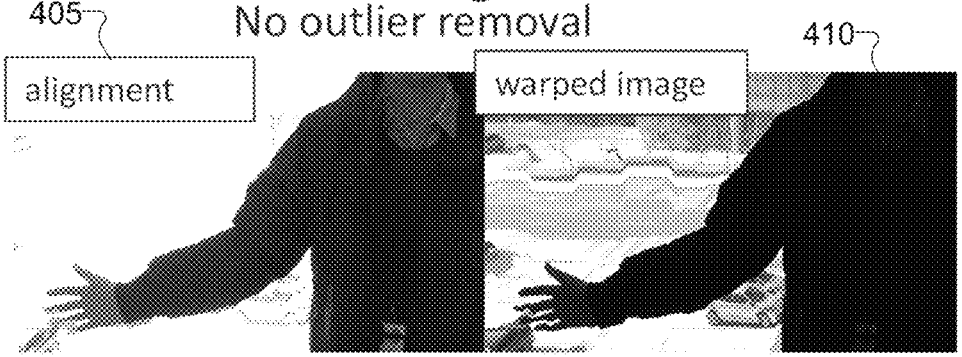
Figure 4C:
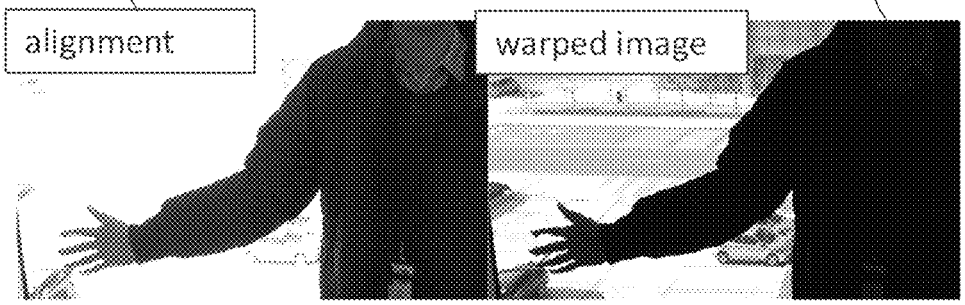
Figure 4D:

FIG. 3 illustrates an example coarse-to-fine tile-based motion vector estimation 240 in accordance with this disclosure. In particular, FIG. 3 illustrates how the coarse-to-fine tile based motion vector estimation 240 shown in FIG. 2B may be used to quickly and accurately produce motion vectors for each tile divided from the reference frame 255. For ease of explanation, the generation of the motion vectors is described as being performed using the electronic device 101 of FIG. 1, although any other suitable electronic device in any suitable system may be used.

The reference frame 325 and non-reference frame 330 correspond respectively to reference frame 255 and non-reference frame 260 shown in FIG. 2B. The frames 325 and 330 are different resolutions of a man waving his left hand while sitting on a ledge in an office building. Behind the man is a window with a view of the city including many natural (trees, clouds, etc.) and manmade objects (other buildings, roads, etc.). The movement of the hand is being lifted from the reference frame 325 to the non-reference frame 330. The movement of the arm causes smaller movements in the overall posture of the man. The motion vector maps can accurately detect the different motions for enhanced local alignment.

The coarse-to-fine tile-based motion vector basically takes a high-resolution image and the resolution is reduced in steps 305a-305d to a low-resolution. Each step is then broken into tiles 310. Starting at the low-resolution step 305a, the tile 310 from the reference frame 325 is found in another frame, such as the non-reference frame 330. In other words, the reference image frame is reduced in resolution and then split into frames. Starting at the low-resolution 305a, the movement of each tile in the reference image is then found in the non-reference image. This allows a search over a large range with low-resolution covering more content.

The motion is found in the low-resolution first step 305a and then the search is moved to a higher resolution second step 305b. The tile 310 in the low-resolution map 305a is used as a search area 315 in the second step 305b. That search area 315 is divided into different frames 320 for searching for the current tile 310 in the different step 305a-305d for matching. Once the tile 310 is found in the second step 305b, the search is moved up again to another higher-level resolution third step 305c.

In the third step 305c, the frame in which the tile 310 was found to match is used as the search area 315 in the third step 305c. The electronic device 101 can divide the search area 315 in the third step 305c into multiple frames. The frames are then searched for the tile 310. Once the tile 310 is found in a frame of the third step 305c, the search is moved up to the highest resolution fourth step 305d.

The electronic device 101 can search the area in the highest resolution fourth step 305d based on the frame 320 of the third step 305c. Once the tile 310 is matched to a frame 320 in the fourth step 305d, the tile 310 is considered to be located in the non-reference image and a motion vector can be developed to determined how far the location of the frame 320 in the final image is compared to the tile 310 in the reference image 325. The movement vectors 340 can be labeled in a motion vector map 335.

The motion vector maps 335 for each resolution show movement vectors 340 based on color and intensity of the color. The color indicates the direction of the movement vector and the intensity of the color indicates the amount of movement in the specified direction. The stronger or darker colors indicate significant movement between the image frames.

While the search area 315 appears in the top left corner of each respective step 305a-305d, the search frame can be located at any frame of the underlying resolution step 305b-305d. The example illustrated in FIG. 3 shows that movement for the tile 310 in the top left corner is negligible in the non-reference frame. The corresponding movement vector 340 in the motion vector map 335 would be very low intensity, if there is any color at all.

In the example shown in FIG. 3, the auto-exposure or other longer-exposure image frame is used as the reference image frame 325 during the coarse-to-fine tile-based motion vector estimation 240, and any areas of the image frame 325 containing motion could be replaced using corresponding areas of the non-reference image frame 330. It is noted that there may be various situations in which one or more saturated areas in the longer-exposure image frame are partially occluded by at least one moving object in the shorter-exposure image frame.

The motion vector estimation 240 can perform a coarse-to-fine alignment on four Gaussian pyramids of the input frames. The electronic device 101 can split the reference image frame into multiple tiles 310. On each pyramid, the electronic device 101 can search for a corresponding tile in a neighborhood of a non-reference image frame 330 for each tile in the reference image frame. The tile size and search radius can vary with the different levels 305a-305d.

The electronic device 101 can evaluate multiple hypotheses when up sampling the coarser level of motion vectors to avoid boundary issue. For same-exposed images, the electronic device 101 can search the movement vector 340 by minimizing an L2 norm distance. For different-exposed images, a search is performed by maximizing normalized cross correlation.

The above searching method can only generate pixel-level alignment. To produce subpixel-accurate motion vectors, the electronic device 101 can use a quadratic function to fit near the pixel minimum and directly compute a subpixel minimum.

FIGS. 4A through 4D illustrate example outlier removal of a non-reference image for use in producing an HDR image of a dynamic scene in accordance with this disclosure. In particular, FIGS. 4A through 4D illustrate how the image outlier removal 245 shown in FIG. 2B may be used to generate an aligned non-reference image for use in producing an HDR image of a dynamic scene. For ease of explanation, the generation of the non-reference image 260 with outliers removed here is described as being performed using the electronic device 101 of FIG. 1, although any other suitable electronic device in any suitable system may be used.

The image 405 shows the non-reference image before local alignment. The background of the image appears as a featureless area. The hand appears blurry due to movement and the arm appears to be wavy.

Motion vectors may not be reliable on "flat areas," such as a saturated area or a featureless area. The "flat areas" are detected by comparing a gradient magnitude accumulation in a tile with a pre-defined threshold. "Large motion vectors" can lead to significant image distortion if they are directly used for image warping.

The electronic device 101 can use motion vectors from the motion vector estimation 2400 to compute a global geometric transformation, which could be described by an affine matrix. Although a transformation is described by an affine matrix, any type of global geometric transformation could be applied. The affine matrix "records" or preserves straight lines in a two-dimensional image. If a distance between a motion vector and the global affine matrix exceeds a threshold, it is referred to as a "large motion vector." If this threshold is too small, the fine alignment results can be close to the global registration. When the threshold is increased, the strength of the local alignment is correspondingly increased.

In image 410, local alignment has been performed, but no outlier removal has been applied. While the arm appears to be aligned with slight misalignment in the fingers and arm, the background is significantly warped. The straight edge of the street is disjointed due to flaws with local alignment procedures experienced by the lack of details in the alignment image. The outlier removal process corrects straight edges in the image 415 when edges are detected. The image 415 still has artifacts due to motion.

After the outlier removal in the flat areas, the electronic device 101 can apply outlier removal in motion areas. As seen in image 420, the artifacts due to motion in the arm and fingers are corrected. Due to the size of the fingers, the motion may not be fully corrected. The accuracy of small details in the finger is a trade off with computing complexity.

Figure 5A:
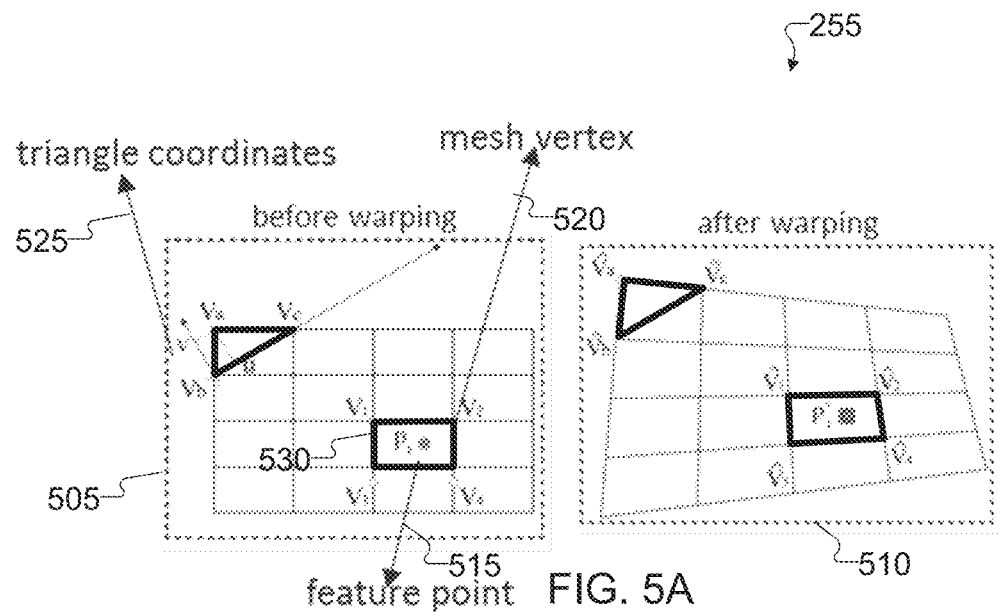
FIGS. 5A and 5B illustrate an example structure-preserving refinement in accordance with this disclosure.
Figure 5B:
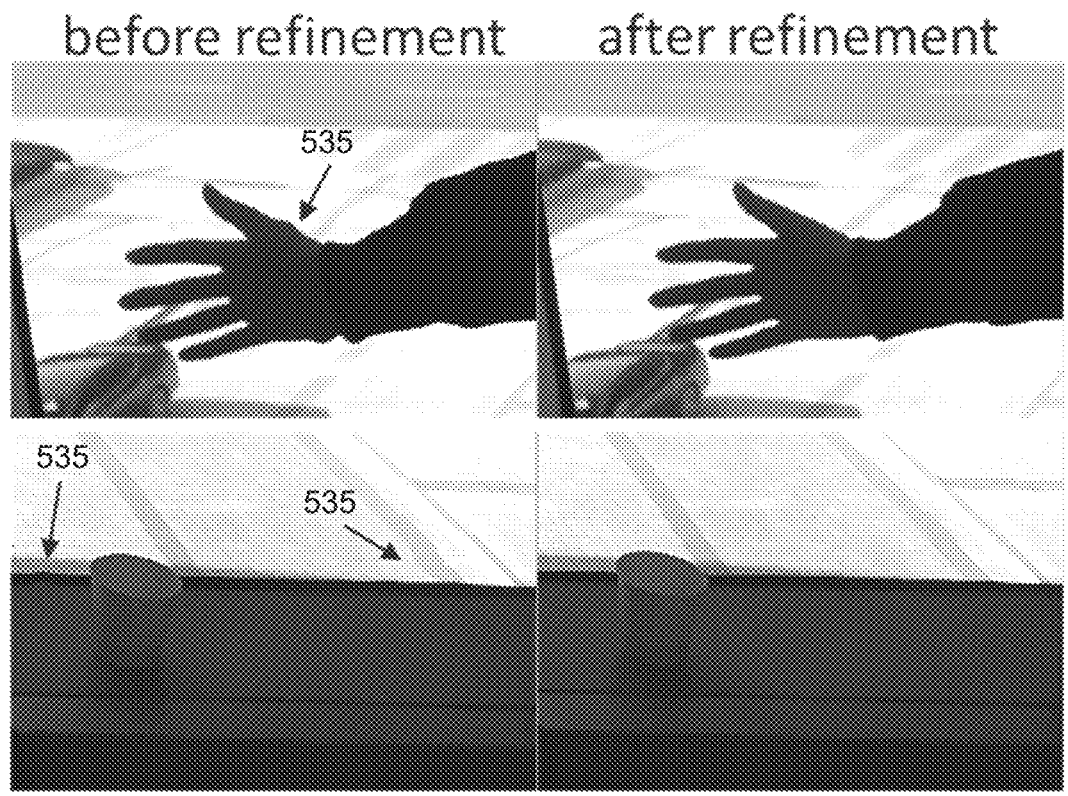

FIGS. 5A and 5B illustrate an example structure-guided refinement operation 255 in accordance with this disclosure. In particular, FIG. 5A illustrates a quadratic mesh of a final image generated used in the structure-guided refinement 250 shown in FIG. 2B. FIG. 5B illustrates an example before refinement image and after refinement image generated using the structure-preserving refinement operation 255 shown in FIG. 2B.

The electronic device 101 can preserve image structure by imposing quadratic constraints on a mesh vertex 505. The quadratic constraint can be defined by the following equation.

$$E=E_p+\Delta_1 E_g+\Delta_2 E_s \tag{1}$$

The local alignment term Ep can represent the error term for feature points 515 (represented by a bilinear combination of vertexes 520) in the non-reference frames 510 after the features points are warped to align with the corresponding feature points in the reference image frame. The feature points 515 in the reference image frame 505 are centers of the tiles on the finest scale. The corresponding feature points are features points in the reference frames 530 shifted by the computed motion vectors.

The similarity term Es represents the error in similarity of the triangle coordinates 525 (formed by three vertexes) after warping, meaning that the shape of the triangles should be similar before warping and after warping to keep Es low. The global constraint term Eg can enhance "flat area" and "large motion areas" to take the global affine transform.

As seen in the before refinement images, artifacts 535 still exist. The bump on the knuckle area of the hand of the person is not actually meant to be in the image; but is an artifact of the local alignment. There are also artifacts 535 that exist on the edge of the ledge at the base of the window. The after-refinement image has these "bump" artifacts 535 corrected.

Although FIGS. 3 through 5B illustrate various examples of image alignment operations, various changes may be made to FIGS. 3 through 5B. For example, FIGS. 3A through 5B are merely meant to illustrate examples of the types of results that could be obtained using the approaches described in this disclosure. Obviously, images of scenes can vary widely, and the results obtained using the approaches described in this patent document can also vary widely depending on the circumstances.

Figure 6:
FIG. 6 illustrates an example improvement to ghost artifacts for HDR applications in accordance with this disclosure.
Figure 7:
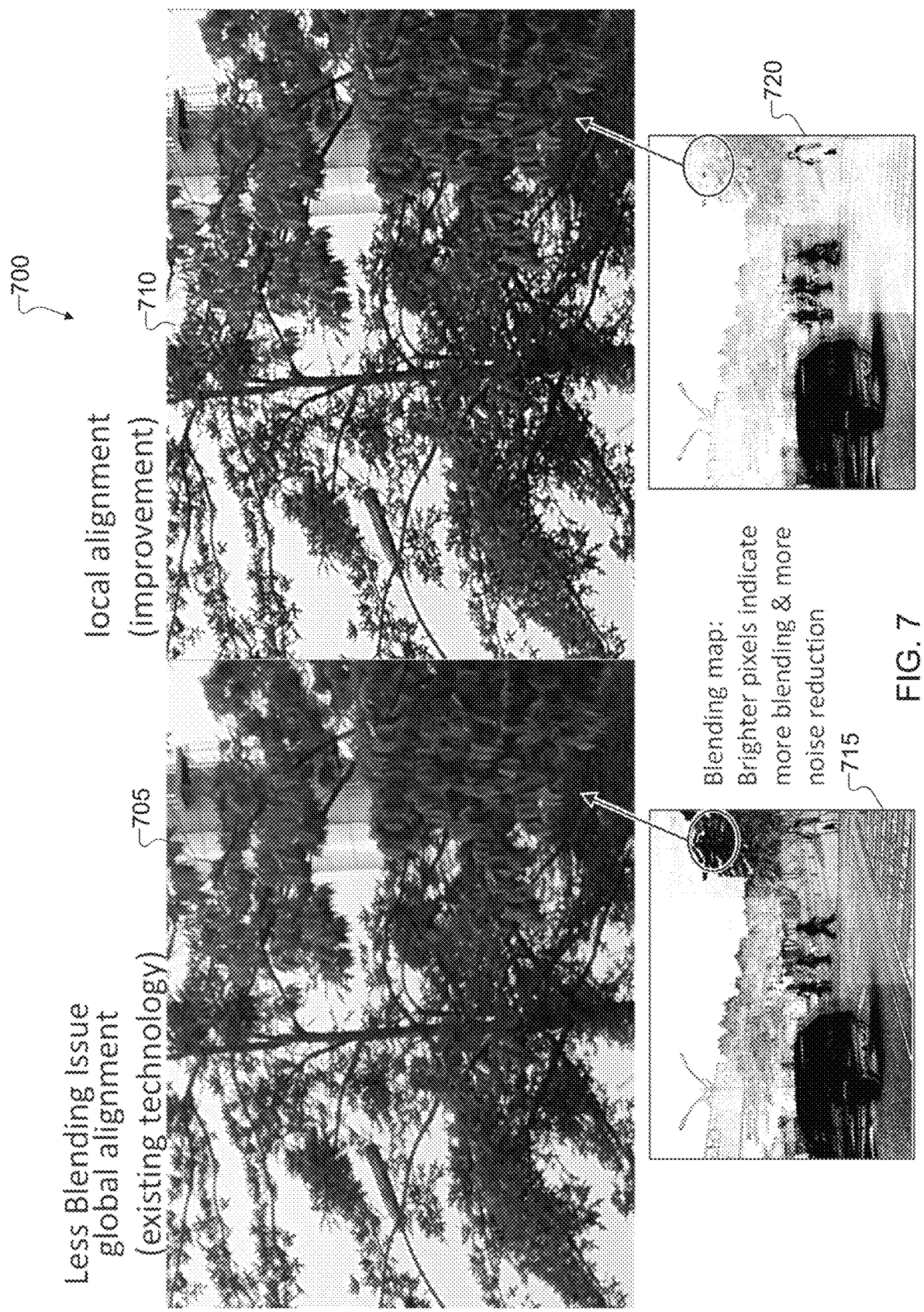
FIG. 7 illustrates an example blending issue reduction for MBR applications in accordance with this disclosure.

FIGS. 6 and 7 illustrate an example enhance results 600, 700 of the image alignment operation 215 in accordance with this disclosure. The embodiments of results 600 and results 700 illustrated in FIGS. 6 and 7 are for illustration only. FIGS. 6 and 7 do not limit the scope of this disclosure to any particular results of an image alignment operation.

FIG. 6 illustrates an example ghost artifact correction 600 for ghost artifacts 615 in accordance with this disclosure. The images capture a side of a person's head and a background through a window. In the background, several buildings can be seen. Above the buildings appear to be lights reflected in the window. A ghost artifact appears around the hair of the person of the global aligned image 605. Using the local alignment methods of this application, the ghosting artifact can be significantly reduced, if not corrected altogether as seen in the local aligned image 610.

FIG. 7 illustrates an example blending issue correction 700 in accordance with this disclosure. The blending issues remaining in the global aligned image 175 can be seen in the trees of the global aligned blending map 715 and the globally aligned image 705. The locally aligned blending map 720 has more detail in the trees that can be deciphered. The locally aligned image 710 has fewer blending issues compared to the globally aligned image.

Figure 8:
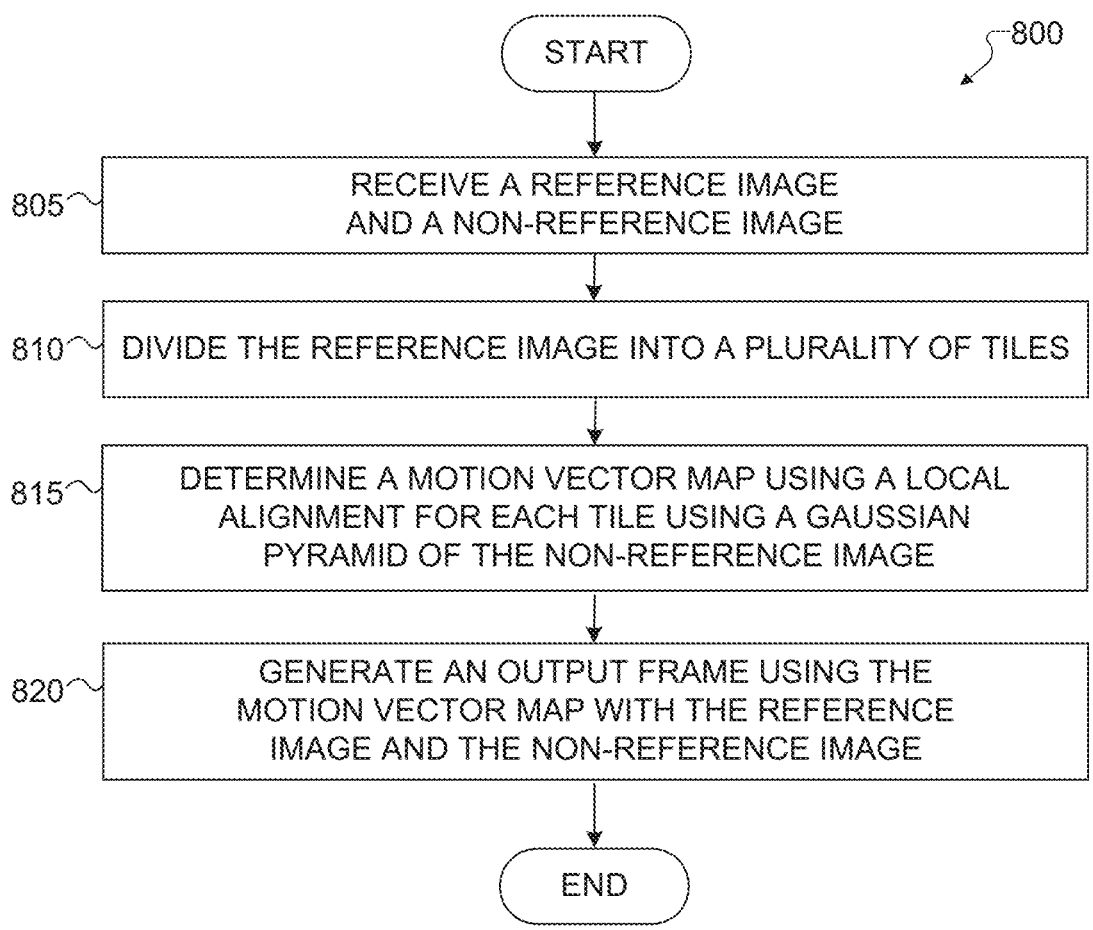
FIG. 8 illustrates an example method for efficient regularized image alignment for multi-frame fusion in accordance with this disclosure.

FIG. 8 illustrates an example method 800 for efficient regularized image alignment for multi-frame fusion in accordance with this disclosure. For ease of explanation, the method 800 shown in FIG. 8 is described as involving the performance of the process 200 shown in FIG. 2A using the electronic device 101 shown in FIG. 1. However, the method 800 shown in FIG. 8 could be used with any other suitable electronic device and in any suitable system.

In operation 805, the electronic device 101 can receive a reference image and a non-reference image. "Receiving" in this context can mean capture using an image sensor, receive from an external device, or load from a memory. The reference image and the non-reference image can be captured using a same lens at different exposures, different lenses at different exposures, different lenses at different resolutions, and the like. The reference image and the non-reference image capture the same subject matter at different resolutions, exposures, offsets, and the like.

In operation 810, the electronic device 101 can divide the reference image into a plurality of tiles. The reference frame is divided into a plurality of tiles in order to search for each tile in one or more non-reference frames. The tiles can be the same size, which means that the image would be evenly divided horizontally and vertically.

In operation 815, the electronic device 101 can determine a motion vector map using a local alignment for each tile using a Gaussian pyramid of the non-reference image. In order to determine the motion vector map, the electronic device 101 can split a lower resolution frame of the Gaussian pyramid corresponding to the non-reference image into a plurality of search tiles. Then for each of the plurality of tiles in the reference image, the electronic device 101 can locate a matching tile from the plurality of search tiles that corresponds to a tile of the plurality of tiles and determine a low-resolution movement vector based on a change in a location of the tile from the reference image to the matching tile in the lower resolution frame of the non-reference image. The result is a generation of a low-resolution motion map based on the low-resolution movement vectors for the plurality of tiles in the reference image. This sub-process can be performed for the lowest resolution level of the Gaussian pyramid.

At each higher resolution level, the electronic device 101 can split a search area in the non-reference image into a plurality of second search tiles, wherein the search area corresponds to the matching tile. The search area in the non-reference image is split into a plurality of second search tiles, where the search area corresponds to the matching tile. A second matching tile from the plurality of second search tiles is located that corresponds to the tile of the plurality of tiles. The electronic device 101 determines a motion vector based on a change in location of the tile in the reference image to the second matching tile in the non-reference image. The motion vector map is generated based on the movement vectors for the plurality of tiles in the reference image.

The electronic device can determine outlier motion vectors in the motion vector map. A global affine matrix is computed using motion vectors in the motion vector map. A difference is determined by comparing each of the motion vectors to the global affine matrix. A large motion vector is determined when the difference is greater than a threshold and the determined large motion vector is removed from the motion vector map.

The electronic device 101 can also determine flat areas to remove from the motion vector map. The non-reference image can be divided into a plurality of non-reference tiles. A gradient magnitude accumulation in a non-reference tile can be compared with a pre-defined threshold and a flat area can be determined based on the gradient magnitude accumulation exceeding the pre-defined threshold. The electronic device 101 can remove motion vectors from the motion vector map that correspond to the flat area.

To preserve image structure, the electronic device can impose quadratic constraints on a mesh vertex of an image structure corresponding to the non-reference image, wherein the quadratic constraints are defined by $E=E_p+\lambda_1 E_g+\lambda_2 E_s$, where $E_p$ is a local alignment term, $E_g$ is a global constraint term, and $E_s$ is a similarity term.

In operation 820, the electronic device 101 can generate an output frame using the motion vector map with the reference image and the non-reference image. After the image alignment process 215, an image blending operation uses the alignment output to generate a blending map. The electronic device 101 performs post-processing using the reference image, the non-reference image, the motion vector map, and the blending map to generate the output image.

Although FIG. 8 illustrates one example of a method 800 for efficient regularized image alignment for multi-frame fusion, various changes may be made to FIG. 8. For example, while shown as a series of steps, various steps in FIG. 8 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   receiving a reference image and a non-reference image;
   dividing the reference image into a plurality of reference tiles;
   determining, using an electronic device, a motion vector map using coarse-to-fine based motion vector estimation with motion vectors determined based on movements of the plurality of reference tiles from the reference image to the non-reference image, wherein the plurality of reference tiles is further divided for each level of the coarse-to-fine based motion vector estimation and a motion vector from a previous level is used to reduce a search area for the plurality of reference tiles at a current level; and
   generating an output frame using the motion vector map with the reference image and the non-reference image.

2. The method of claim 1, wherein determining the motion vector map includes:
   splitting a lower resolution frame of a Gaussian pyramid corresponding to the reference image into groups of reference tiles;
   generating a low-resolution motion vector map of low-resolution motion vectors determined based on movement of the groups of reference tiles in a lower resolution frame corresponding to the non-reference image;
   for each of the plurality of reference tiles in the reference image:
      locating a matching tile from a search tile that corresponds to a reference tile of the plurality of reference tiles, wherein the search tile is defined based on a low-resolution motion vector applied to a corresponding group of reference tiles; and
      determining a motion vector based on a movement of the reference tile from the reference image to the matching tile in the non-reference image; and
   generating the motion vector map based on the motion vector for each of the plurality of reference tiles in the reference image.

3. The method of claim 2, wherein determining the motion vector map further includes:
   splitting a second lower resolution frame of the Gaussian pyramid corresponding to the lower resolution frame of the reference image into second groups of reference tiles;
   generating a second low-resolution motion vector map of second low-resolution motion vectors determined based on movement of the second groups of reference tiles in a second lower resolution frame corresponding to the lower resolution frame of the non-reference image;
   for each of the groups of reference tiles in the lower resolution frame of the reference image:
      locating a matching group of reference tiles from a second search tile that corresponds to a reference group of the groups of reference tiles, wherein the second search tile is defined based on a second low-resolution motion vector applied to a corresponding second group of reference tiles; and determining a low-resolution motion vector based on a movement of the reference group in the lower resolution frame of the reference image to the matching group in the lower resolution frame of the non-reference image; and
generating the low-resolution motion vector map based on the low-resolution motion vector for each of the plurality of reference tiles in the reference image.

4. The method of claim 1, further comprising:
computing a global geometric transformation using the motion vectors in the motion vector map;
comparing a difference for each of the motion vectors to the global geometric transformation;
determining a large motion vector when the difference is greater than a threshold; and
removing the determined large motion vector from the motion vector map.

5. The method of claim 4, further comprising:
dividing the non-reference image into a plurality of non-reference tiles;
comparing a gradient magnitude accumulation in a non-reference tile with a pre-defined threshold;
detecting a flat area based on the gradient magnitude accumulation exceeding the pre-defined threshold; and
removing motion vectors from the motion vector map that correspond to the flat area.

6. The method of claim 1, further comprising:
imposing quadratic constraints on a mesh vertex of an image structure corresponding to the non-reference image.

7. The method of claim 6, wherein the quadratic constraints are defined by:

$$E=E_p+\lambda_1 E_g+\lambda_2 E_s,$$

wherein $E_p$ is a local alignment term, $E_g$ is a global constraint term, and $E_s$ is a similarity term.

8. An electronic device comprising:
at least one sensor; and
at least one processing device configured to:
receive a reference image and a non-reference image;
divide the reference image into a plurality of reference tiles;
determine a motion vector map using coarse-to-fine based motion vector estimation with motion vectors determined based on movements of the plurality of reference tiles from the reference image to the non-reference image, wherein the plurality of reference tiles is further divided for each level of the coarse-to-fine based motion vector estimation and a motion vector from a previous level is used to reduce a search area for the plurality of reference tiles at a current level; and
generate an output frame using the motion vector map with the reference image and the non-reference image.

9. The electronic device of claim 8, wherein, to determine the motion vector map, the at least one processing device is configured to:
split a lower resolution frame of a Gaussian pyramid corresponding to the reference image into groups of reference tiles;
generate a low-resolution motion vector map of low-resolution motion vectors determined based on movement of the groups of reference tiles in a lower resolution frame corresponding to the non-reference image;
for each of the plurality of reference tiles in the reference image:
locate a matching tile from a search tile that corresponds to a reference tile of the plurality of reference tiles, wherein the search tile is defined based on a low-resolution motion vector applied to a corresponding group of reference tiles; and
determine a motion vector based on a movement of the reference tile from the reference image to the matching tile in the non-reference image; and
generate the motion vector map based on the motion vector for each of the plurality of reference tiles in the reference image.

10. The electronic device of claim 9, wherein, to determine the motion vector map, the at least one processing device is further configured to:
split a second lower resolution frame of the Gaussian pyramid corresponding to the lower resolution frame of the reference image into second groups of reference tiles;
generate a second low-resolution motion vector map of second low-resolution motion vectors determined based on movement of the second groups of reference tiles in a second lower resolution frame corresponding to the lower resolution frame of the non-reference image;
for each of the groups of reference tiles in the lower resolution frame of the reference image:
locate a matching group of reference tiles from a second search tile that corresponds to a reference group of the groups of reference tiles, wherein the second search tile is defined based on a second low-resolution motion vector applied to a corresponding second group of reference tiles; and
determine a low-resolution motion vector based on a movement of the reference group in the lower resolution frame of the reference image to the matching group in the lower resolution frame of the non-reference image; and
generate the low-resolution motion vector map based on the low-resolution motion vector for each of the plurality of reference tiles in the reference image.

11. The electronic device of claim 8, wherein the at least one processing device is further configured to:
compute a global geometric transformation using the motion vectors in the motion vector map;
compare a difference for each of the motion vectors to the global geometric transformation;
determine a large motion vector when the difference is greater than a threshold; and
remove the determined large motion vector from the motion vector map.

12. The electronic device of claim 11, wherein the at least one processing device is further configured to:
divide the non-reference image into a plurality of non-reference tiles;
compare a gradient magnitude accumulation in a non-reference tile with a pre-defined threshold;
detect a flat area based on the gradient magnitude accumulation exceeding the pre-defined threshold; and
remove motion vectors from the motion vector map that correspond to the flat area.

13. The electronic device of claim 8, wherein the at least one processing device is further configured to:
impose quadratic constraints on a mesh vertex of an image structure corresponding to the non-reference image.

14. The electronic device of claim 13, wherein the quadratic constraints are defined by:

$$E=E_p+\lambda_1 E_g+\lambda_2 E_s,$$

wherein $E_p$ is a local alignment term, $E_g$ is a global constraint term, and $E_s$ is a similarity term.

15. A non-transitory machine-readable medium containing instructions that when executed cause at least one processor of an electronic device to:
receive a reference image and a non-reference image;
divide the reference image into a plurality of reference tiles;
determine a motion vector map using coarse-to-fine based motion vector estimation with motion vectors determined based on movements of the plurality of reference tiles from the reference image to the non-reference image, wherein the plurality of reference tiles is further divided for each level of the coarse-to-fine based motion vector estimation and a motion vector from a previous level is used to reduce a search area for the plurality of reference tiles at a current level; and
generate an output frame using the motion vector map with the reference image and the non-reference image.

16. The non-transitory machine-readable medium of claim 15, wherein the instructions that when executed cause the at least one processor to determine the motion vector map comprise instructions that when executed cause the at least one processor to:
split a lower resolution frame of a Gaussian pyramid corresponding to the reference image into groups of reference tiles;
generate a low-resolution motion vector map of low-resolution motion vectors determined based on movement of the groups of reference tiles in a lower resolution frame corresponding to the non-reference image;
for each of the plurality of reference tiles in the reference image:
locate a matching tile from a search tile that corresponds to a reference tile of the plurality of reference tiles, wherein the search tile is defined based on a low-resolution motion vector applied to a corresponding group of reference tiles; and
determine a motion vector based on a movement of the reference tile from the reference image to the matching tile in the non-reference image; and
generate the motion vector map based on the motion vector for each of the plurality of reference tiles in the reference image.

17. The non-transitory machine-readable medium of claim 16, wherein the instructions that when executed cause the at least one processor to determine the motion vector map further comprise instructions that when executed cause the at least one processor to:
split a second lower resolution frame of the Gaussian pyramid corresponding to the lower resolution frame of the reference image into second groups of reference tiles;
generate a second low-resolution motion vector map of second low-resolution motion vectors determined based on movement of the second groups of reference tiles in a second lower resolution frame corresponding to the lower resolution frame of the non-reference image;
for each of the groups of reference tiles in the lower resolution frame of the reference image:
locate a matching group of reference tiles from a second search tile that corresponds to a reference group of the groups of reference tiles, wherein the second search tile is defined based on a second low-resolution motion vector applied to a corresponding second group of reference tiles; and
determine a low-resolution motion vector based on a movement of the reference group in the lower resolution frame of the reference image to the matching group in the lower resolution frame of the non-reference image; and
generate the low-resolution motion vector map based on the low-resolution motion vector for each of the plurality of reference tiles in the reference image.

18. The non-transitory machine-readable medium of claim 15, further containing instructions that when executed cause the at least one processor to:
compute a global geometric transformation using the motion vectors in the motion vector map;
compare a difference for each of the motion vectors to the global geometric transformation;
determine a large motion vector when the difference is greater than a threshold; and
remove the determined large motion vector from the motion vector map.

19. The non-transitory machine-readable medium of claim 18, further containing instructions that when executed cause the at least one processor to:
divide the non-reference image into a plurality of non-reference tiles;
compare a gradient magnitude accumulation in a non-reference tile with a pre-defined threshold;
detect a flat area based on the gradient magnitude accumulation exceeding the pre-defined threshold; and
remove motion vectors from the motion vector map that correspond to the flat area.

20. The non-transitory machine-readable medium of claim 15, further containing instructions that when executed cause the at least one processor to:
impose quadratic constraints on a mesh vertex of an image structure corresponding to the non-reference image, wherein the quadratic constraints are defined by:

$$E=E_p+\lambda_1 E_g+\lambda_2 E_s, \text{ and}$$

wherein $E_p$ is a local alignment term, $E_g$ is a global constraint term, and $E_s$ is a similarity term.

* * * * *